United States Patent
Kirvan et al.

(10) Patent No.: US 10,042,651 B2
(45) Date of Patent: Aug. 7, 2018

(54) TECHNIQUES TO CONFIGURE MULTI-MODE STORAGE DEVICES IN REMOTE PROVISIONING ENVIRONMENTS

(71) Applicant: INTEL CORPORATION, Santa Clara, CA (US)

(72) Inventors: Scott Kirvan, Longmont, CO (US); Thomas Slaight, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/951,309

(22) Filed: Nov. 24, 2015

(65) Prior Publication Data

US 2017/0147361 A1    May 25, 2017

(51) Int. Cl.
| | |
|---|---|
| *G06F 9/00* | (2006.01) |
| *G06F 9/24* | (2006.01) |
| *G06F 12/00* | (2006.01) |
| *G06F 9/4401* | (2018.01) |
| *G06F 21/57* | (2013.01) |

(52) U.S. Cl.
CPC .......... *G06F 9/4416* (2013.01); *G06F 9/4406* (2013.01); *G06F 21/575* (2013.01); *G06F 2221/034* (2013.01)

(58) Field of Classification Search
CPC ..................................................... G06F 9/4401
USPC ............................................................ 713/2
See application file for complete search history.

(56) References Cited

U.S. PATENT DOCUMENTS

| | | | | |
|---|---|---|---|---|
| 6,633,976 B1 * | 10/2003 | Stevens | ................. | G06F 9/4401 713/2 |
| 7,334,121 B2 * | 2/2008 | Lee | ..................... | G06F 11/1417 713/1 |
| 7,496,719 B2 * | 2/2009 | Peterson | ............... | G06F 9/4403 711/154 |
| 7,698,739 B2 * | 4/2010 | Hasbun | ................... | G06F 21/51 380/248 |
| 7,958,301 B2 * | 6/2011 | Sutardja | ............. | G06F 12/0246 711/103 |
| 8,639,946 B2 * | 1/2014 | Baker | ................. | G06F 12/1433 713/186 |
| 9,092,349 B2 * | 7/2015 | Schmidt | .............. | G06F 11/1044 |
| 9,293,188 B2 * | 3/2016 | Brandl | ................ | G11C 11/4087 |
| 2012/0102314 A1 * | 4/2012 | Zheng | ..................... | G06F 9/441 713/2 |
| 2016/0077979 A1 * | 3/2016 | Lesartre | ................. | A61B 17/72 711/164 |
| 2016/0139834 A1 * | 5/2016 | Hanson | ................... | H04L 67/30 711/114 |

OTHER PUBLICATIONS

"Unified Extensible Firmware Interface Specification", Version 2.5, Chapter 23, Apr. 2015, 126 pages, (author unknown).

* cited by examiner

*Primary Examiner* — Suresh Suryawanshi

(57) ABSTRACT

Various embodiments are generally directed to an apparatus, method and other techniques to store a first set of instructions in a first portion of the non-volatile memory, the first set of instructions to configure a second portion of the non-volatile memory, cause the processing unit to process the first set of instructions to configure the second portion with one or more regions, and cause a configuration of the memory controller based on the first set of instructions.

26 Claims, 9 Drawing Sheets

_105_

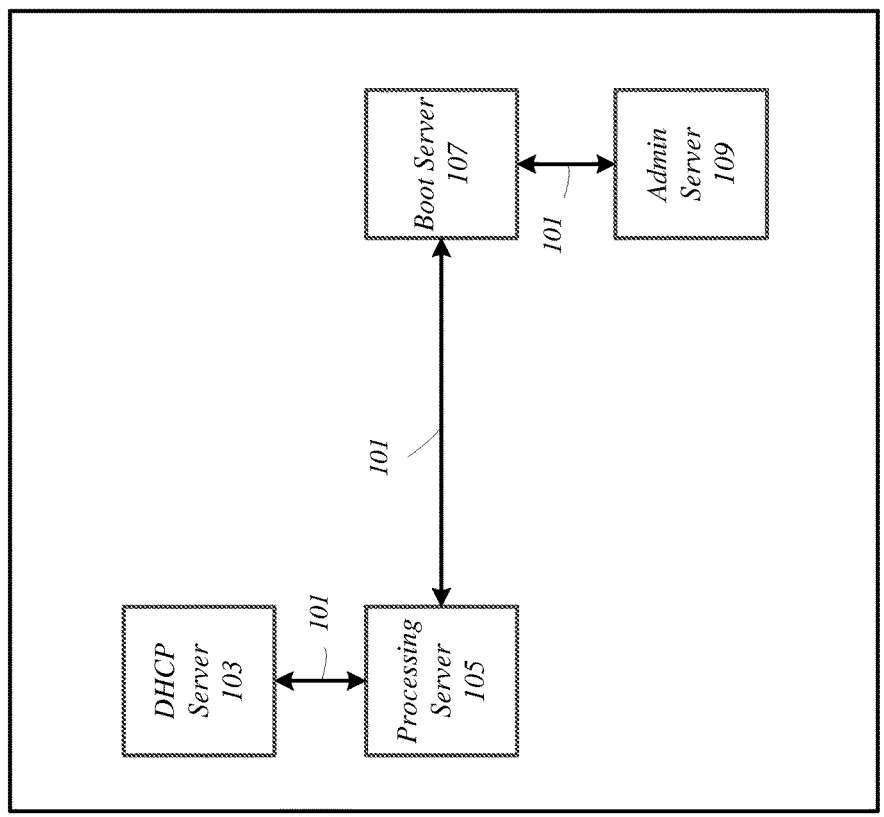

400

STORE A FIRST SET OF INSTRUCTIONS IN A FIRST PORTION OF THE NON-VOLATILE MEMORY, THE FIRST SET OF INSTRUCTIONS TO CONFIGURE A SECOND PORTION OF THE NON-VOLATILE MEMORY
405

CAUSE THE PROCESSING UNIT TO PROCESS THE FIRST SET OF INSTRUCTIONS TO CONFIGURE THE SECOND PORTION WITH ONE OR MORE REGIONS
410

CAUSE A CONFIGURATION OF THE MEMORY CONTROLLER BASED ON THE FIRST SET OF INSTRUCTIONS
415

*FIG. 4*

TECHNIQUES TO CONFIGURE MULTI-MODE STORAGE DEVICES IN REMOTE PROVISIONING ENVIRONMENTS

TECHNICAL FIELD

Embodiments described herein generally relate to techniques to configure a device including non-volatile memory in a network boot environment.

BACKGROUND

Computer manufacturers offer their customers servers that do not have a pre-installed operating system. This enables the customer to install whatever operating system and software they require without needing to remove or update the pre-installed operating system. Customers use manufacturer-supported remote provisioning mechanisms to enable the operating system to be remotely installed through local network connections. The provisioning burden is minimized by centralizing copies of the operating system on a server and loading copies from the server onto another server. One example of provisioning servers with operating systems over network utilizes a client-server environment to boot software assembly, retrieved from the network, in accordance with a Preboot eXecution Environment (PXE) specification which now forms part of the Unified Extensible Firmware Interface (UEFI) standard Version 2.5, published April 2015. The PXE specification details a procedure where a client server discovers a PXE boot server over a network and then boots to an image that is delivered by the PXE boot server. In instances, the procedures utilize unique identifying information of the client server so that a dynamic host configuration protocol (DHCP) may recognize the client server and provide the client server with an internet protocol (IP) address. The client server may then retrieve an operating system boot image from the PXE boot server. Other techniques and procedures may be used to boot a server over a network.

Present systems utilize conventional storage in the form of read-only memory (ROM) or FLASH technologies for holding the pre-boot code, random-access memory (RAM) for holding remote configuration code, and mass storage devices, such as magnetic disk drives, solid state drives, SD Card, etc., for holding the operating system image.

BRIEF DESCRIPTION OF THE DRAWINGS

FIG. 1A illustrates an example of a system.
FIG. 4 illustrates an example of a third logic flow diagram.

DETAILED DESCRIPTION

Figure 1B:
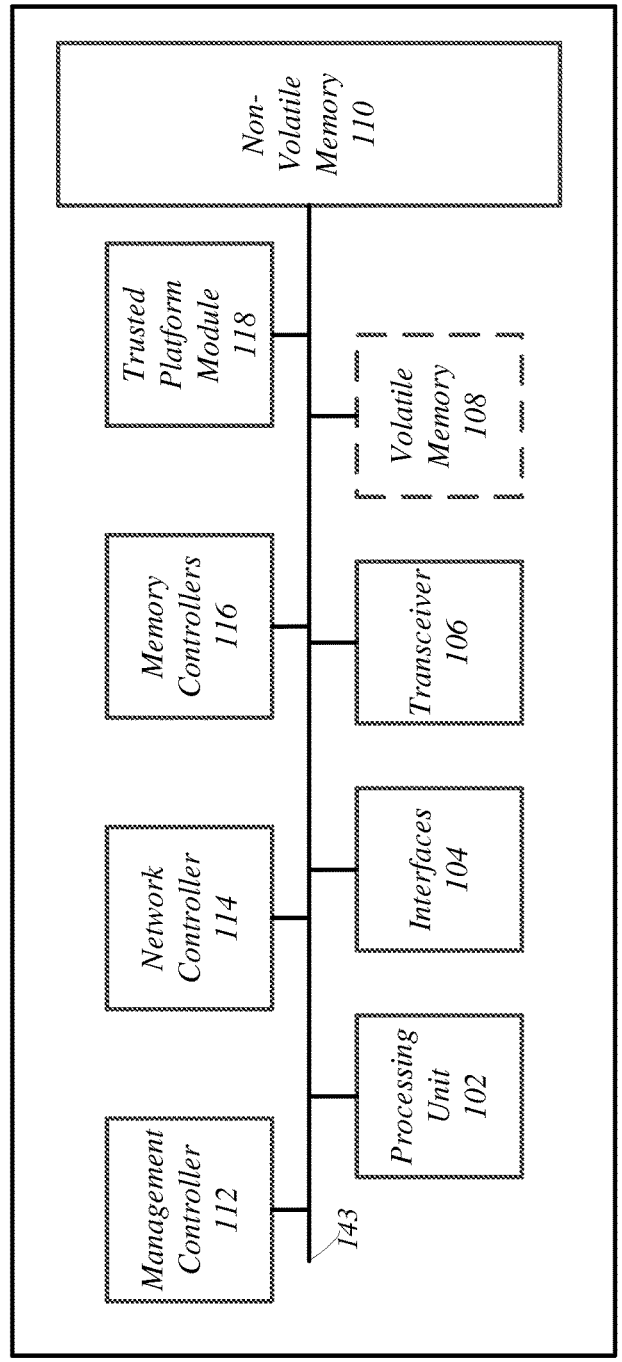
FIG. 1B illustrates an example of a device.

Various embodiment are generally directed to systems, devices, and techniques to configure a device in a network boot environment. In embodiments, a server, such as a "bare-metal" server, may receive an operating system or a bootable image to install the operating system over a network via a mechanism such as PXE. However, PXE and other provisioning procedures may not work properly on servers containing non-volatile memory including a three dimensional cross point device, which combines characteristics of RAM, FLASH, and mass-storage, into a single memory device technology. In some embodiments, a management controller may enable configuration of the non-volatile memory into regions that can be used in the computer system for use as non-persistent primary level RAM, secondary level RAM, non-volatile block storage, persistent RAM, and so forth. Computer systems that incorporate the non-volatile memory can offer the user the ability to configure how much of the memory is utilized for these various modes.

These configuration features introduce a problem over the present remote provisioning approaches in that the non-volatile memory subsystem must be partitioned and configured for these modes prior to it being available for holding images and containers that are deployed via present approaches such as PXE. The persistence of the memory technology, in combination with the memory controller design, provides for the creation of additional mechanisms to distribute and utilize configuration and provisioning software environments in a manner that provides enhanced protection from unauthorized parties, and, in some embodiments, takes advantage of 'containers' and container environments, such as Docker®, for securely deploying the configuration and provisioning software.

For instance, configuration information, an operating system, and a boot loader may be provisioned to a server using containers. The configuration information may be used to configure non-volatile memory prior to installing or applying the operating system, and in particular, when the non-volatile memory serves as the server boot medium. Thus, embodiments are directed to configuring a device including the non-volatile memory prior to provisioning an operating system in the non-volatile memory.

The server may receive configuration information including a set of instructions which may be directed to a portion of non-volatile memory and executed by a processing unit. The one or more instructions configure the non-volatile memory by generating one or more regions in a different portion and configure each of the one or more regions as one of non-persistent primary level RAM, secondary level RAM, non-volatile block storage, and as persistent RAM. The set of instructions may also include information to configure a size, an address range, and so forth for each of the regions. In some instances, the server may receive the configuration information which may be directed to volatile memory. The configuration information may be executed by the processing unit and configure the non-volatile memory from the volatile memory.

The operating system may be provisioned into a generated region of the non-volatile memory and booted to create a run-time environment. In some embodiments, a provisioning operating system can be utilized to retrieve a full operating system to create a run-time environment. The provisioning operating system may be a relatively smaller operating system having the configuration information including instructions to configure a region and to retrieve the full operating system, for example.

Embodiments also include workload containers including a payload of one or more applications and their dependencies that may be communicated with or subsequent to the configuration information. Additional features include provisioning the workload containers in generated regions of the non-volatile memory and controlling access to these regions to provide a more secure platform.

Additional features include security enhancements such as verifying signatures of the configuration information, the operating system, and workload containers prior to applying them in the non-volatile memory and using encryption keys to control reads and writes to the non-volatile memory. In some embodiments, one or more keys may be provisioned in a security module, such as a trusted platform module, and are used to verify the configuration information, operating system, and workload containers. These and other details will become more apparent in the following description.

Various embodiments also relate to an apparatus or systems for performing these operations. This apparatus may be specially constructed for a purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform a method. The structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an embodiment of a system 100 to process information and data. Moreover, system 100 includes a number servers, devices, components, modules and processing circuitry to process information and instructions in a network boot environment. A network boot environment may include one or more servers or computing devices that are configurable and capable of booting an operating system or into an environment to support processing one or more applications by receiving the operating system or environment from another server or device. More specifically, a server may communicate a request for configuration information and an operating system to a plurality of servers coupled by one or more wired or wireless network connections. In response, the server may receive configuration information including an instruction set to configure the server including non-volatile memory. The server may also receive the operating system including instructions to boot into the operating system. In some instances, the server may first receive configuration information including instructions to configure the system and then subsequently receive the operating system to load into configured non-volatile memory. Embodiments may also include receiving one or more workload containers including one or more applications and their dependencies to process information. The one or more applications may also be loaded into the configured non-volatile memory and operate in a dedicated environment utilizing the operating system to process information. Embodiments are not limited in this manner.

System 100 illustrates a number of servers, including a DHCP server 103, a processing server 105, a boot server 107, and an administrative server 109 coupled by one or more network connections 101. Although FIG. 1A illustrates system 100 having a limited number of servers, embodiments are not limited in this manner. For example, each of the servers may represent a number or cluster of servers to support the network boot environment. In some instances, system 100 may include any number of intermediate processing devices to enable communications between the servers. Embodiments are not limited in this manner.

Further, each of the servers 103, 105, 107, and 109 may be any type of computer including a personal computer, desktop computer, tablet computer, netbook computer, notebook computer, laptop computer, a server, a server farm, blade server, a symmetric multiprocessor (SMP) server, or any other type of server, and so forth.

In embodiments, the processing server 105 may be a network booted server that may initially be a 'bare-metal' server that is not configured and does not initially include a 'local' operating system. The processing server 105 includes a number of hardware components in which an operating system, such as the Windows® operating system, the Apple® operating system, the Linux® operating system, the Android® operating system, and so forth, may be received from another device and booted into to create an environment to process information and workload containers. In some instances the operating system may be a provisioning operating system including instructions to load into non-volatile memory and used to retrieve another operating system.

In embodiments, the configuration information, the operating system, and a boot loader may be communicated to the processing server 105 to configure the processing server 105 and boot the operating system. In one example, the processing server 105 may first receive configuration information including one or more instructions to initially configure the processing server 105 including non-volatile memory, such as three dimensional crosspoint device memory that combines characteristics of RAM, FLASH, and mass-storage, into a single memory device technology. Once configured, the processing server 105 may receive the operating system and boot loader to load and boot on the processing server 105.

In another example, the configuration information may be provisioned by an original equipment manufacturer (OEM) of the memory device, for example, and used to configure the processing server 105 prior to receiving, loading, and booting an operating system. For example, the configuration information may be loaded/stored into a non-volatile memory which may be different or the same as the non-volatile memory for configuration. On initial boot-up, the configuration information may be verified and executed by a processing unit to configure the non-volatile memory for the operating system and workload containers.

The system 100 may also include a DHCP server 103 which may be any type of server capable of dynamically distributing network configuration parameters including IP addresses. In some embodiments, the DHCP server 103 may receive a request for an IP assignment and a provisioning address including a location of configuration information, an operating system, and boot loader from the processing server 105. In response, the DHCP server 103 may assign the processing server 105 an IP address and communicate a provisioning address for one or more boot servers 107 to the processing server 105. Embodiments are not limited in this manner and the DHCP server 103 may provide other services and parameters in system 100.

In embodiments, the system 100 also includes a boot server 107 that may be any type of server that is capable of receiving a request for an operating system and one or more containers and providing a response. The boot server 107 may communicate configuration information, the operating system and one or more workload containers to the requesting device or server in a response to the request. One example exchange may include the processing server 105 sending a request to the boot server 107 for an operating system. In response the boot server 107 may send the operating system to the processing server 105. In some embodiments, the boot server 107 may operate in accordance with the PXE specification to process the request and communicate the operating system to the processing server 105. In some instances, the boot server 107 may also communicate configuration information prior to or with the communication of the operating system. In some instances, more than one server may provide the boot server role where one server provides an operating system and different server provides the configuration information.

In embodiments, the boot server 107 may be coupled with the administrative server 109 which may provide the operating system to the boot server 107 to use during the client-server network boot exchange. In some embodiments, the administrative server 109 may be used to generate configuration information for the operating system and the one or more workload containers that may be used to configure non-volatile memory along with other components. The configuration information may include a set of instructions to configure regions of the non-volatile memory as non-persistent primary level RAM, secondary level RAM, non-volatile block storage, or as persistent RAM. Moreover, the configuration information may establish one or more of a volatile memory size, a persistent memory size, a block size, and so forth. The configuration information may also include a specific memory range to configure the non-volatile memory. In some instances, the non-volatile memory includes a plurality of regions and at least one of the regions can configured differently than another region. For example, one region may be configured as volatile memory used by a processing unit to store run-time instructions. Another region may be configured as non-volatile block storage to store the operating system. While a third region may be configured as non-volatile block storage to store a boot loader.

In addition, each operating system and/or workload container may include specific configuration information based on processing requirements. For example, the operating system includes configuration information to configure the non-volatile memory in specific manner based on the requirements of the operating system. In another example, a workload container may include different configuration information to configure the non-volatile memory in a different manner. Embodiments are not limited in this manner.

FIG. 1B illustrates one example embodiment of a processing server 105. Although FIG. 1B illustrates processing server 105 having a limited number of elements, embodiments are not limited in this manner. In embodiments, the processing server 105 includes a processing unit 102, one or more interfaces 104, a transceiver 106, and non-volatile memory 110. In some embodiments, the processing server 105 may optionally include volatile memory 108. However, in other embodiments, the non-volatile memory 110 may include a region configured to appear to serve as volatile memory to the operating system and the processing server 105 may not have dedicated volatile memory. The processing server 105 also includes a management controller 112, a network controller 114, and memory controllers 116.

In embodiments, the processing unit 102 can include one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing unit 102 may be connected to and communicate with the other elements of the processing server 105 via interconnects 143, such as one or more buses, traces, connectors, control lines, and data lines. In some embodiments, the processing unit 102 may include processor registers or a small amount of storage available to the processing units to store information including instructions that and can be accessed during execution. Moreover, processor registers are normally at the top of the memory hierarchy, and provide the fastest way to access data. These processor registers may be utilized to process information and data elements described herein.

The processing server 105 also includes one or more interfaces 104 which may be any device having circuitry for processing information and communicating over wireless and wired connections. For example, the one or more interfaces 104 may include a Universal Serial Bus (USB) ports, IEEE 1394 Firewire ports, Serial ports, parallel ports, printer port, Centronics ports, PS/2 port, a VGA port, a DVI port, an HDMI port, audio port, MIDI port, RG-6 port, a DisplayPort® port, a Gigabit Ethernet port, a hot pluggable storage port, Thunderbolt, and so forth. In some embodiments, the interfaces 104 may include a receiver, a transmitter, one or more antennas, and/or one or more Ethernet connections. The specific design and implementation of the interfaces 104 may be dependent upon the communications network in which the processing server 105 is intended to operate.

In some embodiments, the interfaces 104 may include network interfaces such as an in-band interface and an out-of-band interface. The in-band interface and out-of-band interface may each be capable of communicating information via a network connection using one or more protocols, for example. In addition, the in-band interface and out-of-band interface each may have a network address that includes a node identification (ID) and a port number and may be separately addressable. In some instances, the network interfaces provide circuitry to interface the processing server 105 with one or more other servers. Further and as will be discussed in more detail below, each of the network interfaces can provide different paths of communication to different components of the processing server 105 to ensure information security.

In some embodiments, the processing server 105 may have a transceiver 106 which includes one or more components and circuitry to transmit and receive information using radio-frequency signals. More specifically, the transceiver 106 may include circuitry to produce radio-frequency mobile radio signals which are to be sent and for processing radio-frequency mobile radio signals which have been received. To this end, the transceiver 106 may be coupled to one or more antennas (not shown). The transmitted or received mobile radio signals are in one or more particular frequency ranges, which are typically prescribed by the mobile radio standard(s) supported by the radio-frequency assemblies. For example, transceiver 106 can include circuitry to process information according to one or more IEEE standards, one or more peer-to-peer protocols, 3GPP LTE standards, and so forth. Various embodiments are not limited in this manner and transceiver 106 may transmit or receive information via any standard in any frequency range with one more devices, as previously mentioned.

In various embodiments, the processing server 105 includes a transceiver 106 which may be used to communicate with one or more other devices or stations via one or more antennas. The transceiver 106 may send and receive information from the stations as one or more pockets, frames, and any other transmission structure in accordance with one or more protocols.

The processing server 105 may include a volatile memory 108 to store information. Further, volatile memory 108 may be implemented using any machine-readable or computer-readable media capable of storing data. In some embodiments, the machine-readable or computer-readable medium may include a non-transitory medium. The embodiments are not limited in this context. The volatile memory 108 may be a secure memory or have a portion dedicated as secure.

In embodiments, the volatile memory 108 can store data momentarily or temporarily until power is interrupted. The volatile memory 108 can store instructions and data for processing server 105. The volatile memory 108 may also store temporary variables or other intermediate information while the one or more processing unit 102 is executing instructions. In some embodiments, information and data may be loaded from volatile memory 108 into the computing registers during processing of instructions by processing unit 102. Manipulated data is then often stored back in volatile memory 108, either by the same instruction or a subsequent one. The volatile memory 108 is not limited to storing the above discussed data; the volatile memory 108 may store any type of data.

The processing server 105 also includes non-volatile memory 110 which may be any storage device that can store information with or without power applied. The non-volatile memory 110 may be a next generation non-volatile device, such as a three dimensional crosspoint memory device, or other byte addressable nonvolatile memory devices. Thus, the non-volatile memory 110 may be any device that can be configured into different regions each capable of being configured to operate in a volatile manner or a non-volatile manner. In embodiments, volatile memory 108 or non-volatile memory 110 can be or include multi-threshold level NAND flash memory, NOR flash memory, single or multi-level Phase Change Memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, magnetic computer storage devices (e.g. hard disk drives, floppy disks, and magnetic tape), or a combination of any of the above, or other memory, and so forth. In one embodiment, the non-volatile memory 110 can be a block addressable memory device, such as NAND or NOR technologies. Embodiments are not limited to these examples.

In embodiments, the non-volatile memory 110 may be used to boot an operating system communicated to the processing server 105. In these embodiments, the non-volatile memory 110 may be configured prior to the installation of the operating system on the non-volatile memory 110. Thus, as will be discussed in more detail below, the configuration information including instructions communicated with or prior to an operating system can be used by one or more components of processing server 105, such as the, processing unit 102, the management controller 112, and the memory controllers 116 to configure the non-volatile memory 110. In some instances, the configuration information may be stored in a portion of the non-volatile memory 110 prior to being configured. The configuration information may be executed by the processing unit 102 and configure a remaining portion of the non-volatile memory 110. For example, one or more regions may be created in the remaining portion of the non-volatile memory 110 to store the operating system, a boot loader, and other workload containers having payloads. The regions may be created based on the configuration information including specified sizes and address ranges. Further, the regions may be configured as one of a non-volatile block storage device, a volatile memory, a non-persistent primary level RAM, a secondary level RAM, and a persistent RAM. For example, a particular region may be configured for an operating system having a specified memory size within a particular address range. The particular region may be configured as a block device based on the configuration. Moreover, a region configured as a block device provides a level of abstraction to store information in a block format including the operating system. Data may be written to the particular region as "blocks" having a sequence of bytes or bits. A similar configuration for the non-volatile memory 110 may be performed prior to a container being installed in the non-volatile memory 110. Embodiments are not limited in this manner.

In some embodiments, the non-volatile memory 110 may be provisioned with the configuration information by the manufacturer (OEM) at the time of manufacture. During an initial startup the configuration information may be executed by the processing unit 102 to configure the non-volatile memory 110 without having to download the information. Further, the configuration information provisioned by the OEM may include a key which may be used by the processing server 105 to verify the configuration information and the non-volatile memory 110 itself.

Various embodiments may also include the processing server 105 having a management controller 112 which includes circuitry to perform various operations to support and enable remote booting. The management controller 112 may include one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit.

In embodiments, the management controller 112 is capable of processing information, such as configuration information including instructions, an operating system, and a boot loader. The configuration information, the operating system, and the boot loader may be received via an in-band network interface coupled with the network controller 114 or via an out-of-band network interface coupled with the management controller 112, for example. The management controller 112 may process the received information by directing the information to the appropriate storage or memory. For example, the management controller 112 may direct the configuration information to volatile memory 108 or to a portion of the non-volatile memory 110 for storage. In another example, the management controller 112 may direct the operating system and workload container payloads to regions of the non-volatile memory 110 for storage.

The management controller 112 can enable storing information, such as the configuration information, in the non-volatile memory 110 prior to configuration by identifying or detecting the memory controllers 116, loading a driver into volatile memory 108 to communicate with the memory controllers 116, and configuring a portion the non-volatile memory 110 to store the configuration information. Instructions to perform these functions may be communicated with or as part of the configuration information and executed by the processing unit 102.

The management controller 112 can also initiate processing of the configuration information to configure the processing server 105 including the non-volatile memory 110. For example, the management controller 112 may coordinate and instruct the processing unit 102 to execute the instructions of the configuration information. The processing unit 102 may execute the instructions and configure the non-volatile memory 110 including generating one or more regions. For example, one or more regions may be allocated based on the configuration information. Each region may have a specified configuration indicating one or more of a memory size, an address range, a non-volatile block storage device configuration, a volatile memory configuration, a non-persistent primary level RAM configuration, a secondary level RAM configuration, and a persistent RAM configuration. This configuration information may be stored in the non-volatile memory and processed by the processing unit 102. Control may be handed back to the management controller 112 to continue configuring the processing server 105.

Figure 1C:
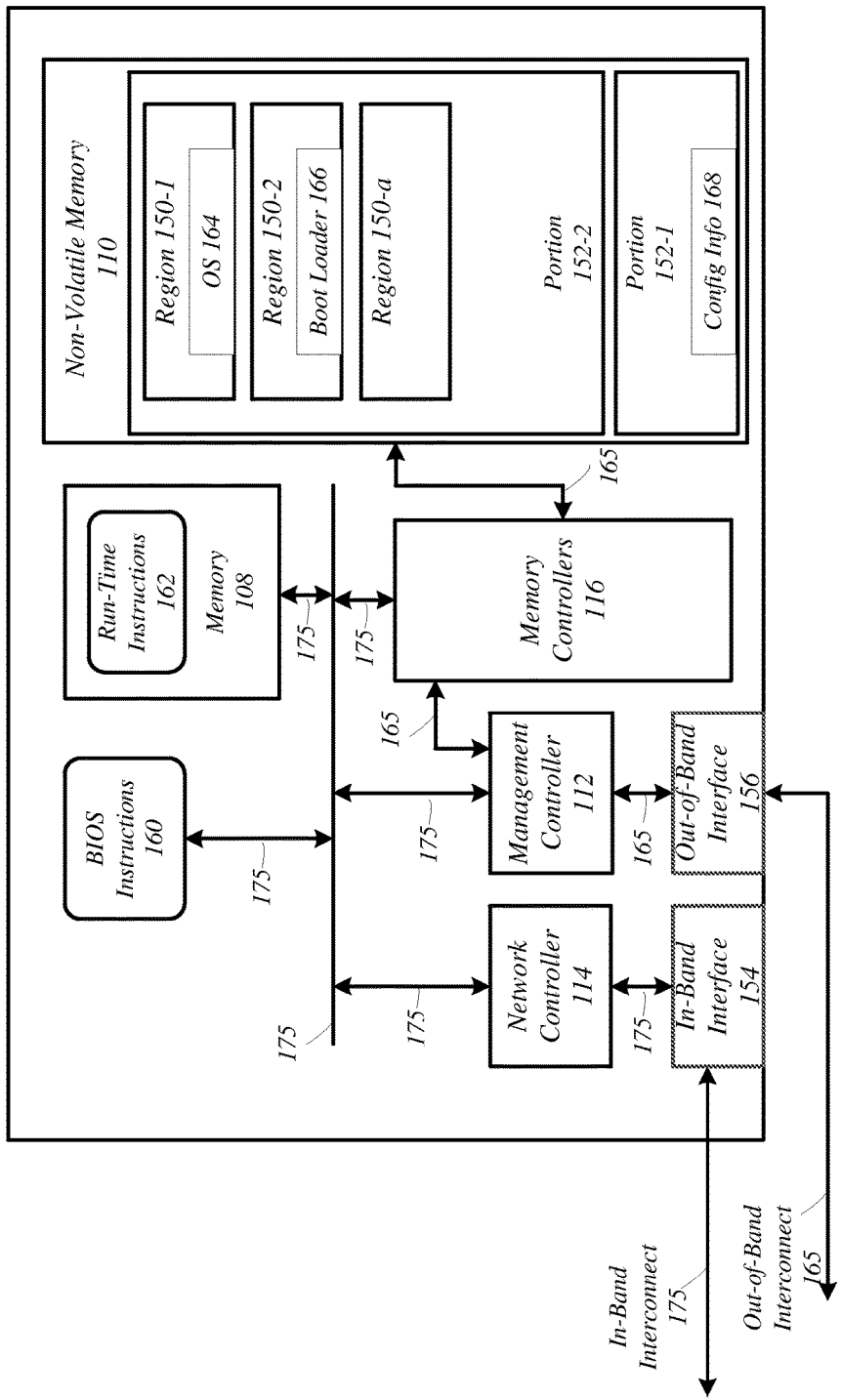
FIG. 1C illustrates a block diagram of a device.

For example, the management controller 112 may cause the memory controller(s) 116 to reconfigure or reload by initiating a restart operation of the processing server 105 once the non-volatile memory 110 is configured based on the configuration information. During the restart operating a set of instructions, such as basic input/output system (BIOS) instructions 160, as illustrated in FIG. 1C, may execute to reconfigure or reprogram the memory controllers 116 with the configuration information stored in the non-volatile memory 110. Further, the BIOS instructions 160 recreate the Advanced Configuration and Power Interface (ACPI) tables and may continue performing any remaining provisioning steps based on the configuration information, such as retrieving an operating system and boot loader.

More specifically, the processing server 105 may receive the operating system and boot loader and the management controller 112 may store or cause the operating system to be stored in the non-volatile memory 110 in an allocated region, for example. The region may be dedicated space to store the operating system. The region size and/or a specified address ranges for allocation may be defined in the configuration information, as previously discussed. In embodiments, the management controller 112 may also configure the region as a non-volatile block device which may enable the operating system to boot as a local boot device. Similarly, the management controller 112 may store the boot loader in the same or a different region as the operating system. The boot loader may be invoked by the BIOS instructions 160, for example, and used to boot the operating system. In embodiments, the management controller 112 may store the operating system and/or boot loader in non-volatile memory 110 by utilizing the memory controllers 116 having logic and a microprocessor to present the configured region(s) as a block interface which may be written to in a block format.

In embodiments, the management controller 112 also controls the boot operation to load and execute the operating system in the non-volatile memory 110. In some instances, the management controller 112 controls access to the non-volatile memory 110 and specifically to the region created for the operating system. For example, during the boot operation, the management controller 112 may permit the BIOS instructions 160 to access the region having the operating system to configure hardware devices of the processing server 105 during the boot operation. Once the boot operation completes, the management controller 112 may block access to the region of non-volatile memory 110 by the BIOS instructions 160. Embodiments are not limited to this example and the management controller 112 may control access to the non-volatile memory 110 by other devices, operations and functions. In some embodiments, the BIOS instructions 160 may block themselves from accessing the region once the boot operation completes. For example, the BIOS instructions 160 may utilize a register of the memory controllers 116 that, once written to, blocks access to the non-volatile memory 116 until the next time the processing server 105 resets.

The management controller 112 may process a workload container which includes one or more applications and support files that execute on top of the operating system. More specifically, the management controller 112 may cause the one or more applications and support files to be stored in the appropriate region of the non-volatile memory 110. The region for the workload container may have been configured with other regions of the non-volatile memory via the configuration information. The region for the workload container may be a different region than the region storing the operating system. The region may have a specific size, location, address range, and so forth, defined by the configuration information. In addition, the region may be configured as non-volatile block storage, or as persistent RAM to store the payload.

In some embodiments, the management controller 112 may enable one or more security features to ensure the integrity of an operating system and workload containers. For example, the management controller 112 may use a key in firmware that is used to encrypt other keys. In some embodiments, the key may be in stored in a field hardware fusing mechanism accessible to the management controller 112, such as a trusted platform module (TPM) 118. The keys may be used by the management controller 112 and/or memory controllers 116 to verify read and write operations performed in the non-volatile memory 110.

In some embodiments, the management controller 112 may also use one or more keys to validate the configuration information, the operating system and/or workload containers prior to them being stored in the non-volatile memory 110. For example, the management controller 112 may ensure the integrity of the operating system and/or workload containers as they are received by verifying a signature for each of the operating systems and workload containers. Embodiments are not limited in this manner.

The management controller 112 also controls various aspects for initiating the retrieval and installation of the operating system and workload containers. For example, the management controller 112 may communicate a request, via the network controller 114 and a network interface, for an IP address and a provisioning address. The request may be communicated using a broadcast, multicast, or unicast address. The management controller 112 may receive the provisioning address associated with a remote device to retrieve an operating system and/or one or more workload containers. In addition, the processing server 105 may also be assigned an IP address. In some embodiments, the operating system and workload containers may be provided by different remote devices, and therefore, associated with different provisioning addresses.

The management controller 112 may communicate a request for an operating system and/or a workload container to a remote device based on the provisioning address. In embodiments, the request may be communicated using a unicast or multicast address based on the provisioning address. In response, the management controller 112 may receive an operating system and/or workload containers to process, as previously discussed.

In embodiments, the processing server 105 includes a network controller 114 which may include circuitry to send and receive information to other devices on a network. In some embodiments, the network controller 114 is an Ethernet controller which includes integrated circuitry that controls Ethernet communications over a network. For example, the network controller 114 may process each packet received on an interface, such as an in-band interface or an out-of-band interface, to determine whether the packet is for the processing server 105 or another device based on addressing. The network controller 114 may decode the packet if it's intended for the processing server 105, in this example. The network controller 114 may communicate the information in the packets to other components and elements of the processing server 105 including the processing unit 102 and the management controller 112. Embodiments are not limited in this manner.

The processing server 105 also includes the memory controllers 116 which includes circuitry to control various aspects of the non-volatile memory 110. Generally, the memory controllers 116 manage or control the flow of data going to and from the non-volatile memory 110 including read and writes. Further, the memory controllers 116 may control various aspects of configuration of the non-volatile memory 110.

The memory controllers 116 can be used to configure the non-volatile memory 110 by the processing unit 102 processing the configuration information. For example, the configuration information may define regions in the non-volatile memory 110, a memory size for each of the regions, creating one or more block devices, configuring a block device as a boot device, configuring the regions in accordance with specific address ranges, configuring regions as persistent or non-persistent memory, and so forth. In one example, the memory controllers 116 may be instructed to create a region in a portion of the non-volatile memory 110 to store an operating system from the management controller 112. In another example, the memory controllers 116 may receive an instruction to configure a portion of the non-volatile memory 110 as a region to store a workload container including a payload. The region may be of a size and/or in a specific address range designated by the configuration information, for example.

In embodiments, the memory controllers 116 may be configured or reconfigured by a management controller 112 and/or the processing unit 102 in accordance with the configuration information. More specifically, processing unit 102 may process configuration information stored in a portion of the non-volatile memory 110 to reprogram the memory controllers 116 and ACPI tables based on the configuration information.

The memory controllers 116 also control write operations to store information in the non-volatile memory 110 and read information from the non-volatile memory 110. In some embodiments, read and write operations may be secured by the memory controllers 116 using one or more keys to verify the operations. For example, a particular region may be associated with a key. The memory controllers 116 may only process read operations and/or write operations for the particular region if they utilize the matching key.

In some embodiments, the memory controllers 116 may provide other security enhancements by receiving and processing information via one or more out-of-band interconnects or network connections and limit access to other components and elements of the processing server 105. The out-of-band interconnects can be one or more dedicated connectors, traces, buses, channels, and so forth between components. For example, an out-of-band interconnect may be established between a dedicated interface 104, the management controller 112, and the memory controllers 116 to communicate the operating and/or containers. For example, information, including the configuration information, the operating system, and workload containers, may be received by a dedicated interface and communicated directly to the management controller 112 and the memory controllers 116 for storage in the non-volatile memory 110. A dedicated interface 104 may be an interface directly connected with a provisioning remote device, provides enhanced security features including encryption techniques, and so forth. Moreover, the dedicated interface may communicate information directly to the management controller 112 and memory controllers 116 while excluding the processing unit 102. Embodiments are not limited this manner.

In some embodiments, the processing server 105 may include the TPM 118 to store keys that may be used to verify configuration information, a provisioning operating system, a full operating system, a boot loader, one or more containers, and so forth. The TPM 118 may be a secure cryptoprocessor, which is a dedicated microprocessor designed to secure hardware, such as the non-volatile memory, by integrating cryptographic keys into devices including the processing server 105 Embodiments are not limited in this manner.

FIG. 1C illustrates an example of a block diagram of an embodiment of processing server 105 that includes hardware elements, software elements, in-band interconnects, and out-of-band interconnects. More specifically, the block diagram of the processing server 105 illustrates various components coupled via one or more in-band interconnects 175 and out-of-band interconnects 165. As previously mentioned, the out-of-band interconnects 165 may be dedicated connectors, traces, buses, channels, and so forth, to couple one or more elements or components. In some embodiments, the out-of-band interconnects 165 may use the same connectors, traces, or buses as the in-band interconnects 175, but on a dedicated channel which may be secure.

Moreover, the out-of-band interconnects 165 may enable secure communication between various components of the processing server 105. For example, an out-of-band interconnect 165 may be established between an out-of-band interface 156, the management controller 112 and the memory controller 116 to communicate information such as the operating system, the boot loader, the configuration information, and/or containers and payloads. For example, an operating system can be communicated for storage from the memory controller 116 to the non-volatile memory 110 via an out-of-band interconnect 165. In another example, an out-of-band interconnect 165 may allow the management controller 112 to receive information such as configuration information, the operating system and/or containers from a remote device or server via the out-of-band interface 156. The out-of-band interconnect 165 may be more secure than an in-band interconnect 175 because it is a direct connection between components that are not directly accessible by software running on the processing server 105. Thus, other components may not be able to access information on the out-of-band interconnect 165. Further, the out-of-band interface 156 may provide a more secure connection with a remote device by utilizing a dedicated channel and/or encryption techniques to communicate information. The out-of-band interface 156 may be directly coupled with the management controller 116 to limit access to communicated information by other elements of the processing server 105. In other instances, the out-of-band interface 156 may be coupled with the management controller 116 via a dedicated channel of the network controller 114.

The processing server 105 also includes in-band interconnects 175. In embodiments, data communicated over an in-band interconnect 175 may be sent over a shared connector, trace, bus, or channel. In other words, communications sent via an in-band interconnect 175 may be available for a number of elements to receive or see. In some instances, the information communicated over the in-band interconnects 175 may be received by an in-band interface 154 coupled with the network controller(s) 114. However, embodiments are not limited in this manner.

Further, FIG. 1C illustrates the non-volatile memory 110 having portions 152-1 and 152-2 and regions 150-a, where a may be any positive integer. Each portion 152 may be a number of bits or bytes to store information in the non-volatile memory 110. In some instances, a first portion 152-1 of the non-volatile memory 110 may receive and store configuration information 168 to configure the non-volatile memory 110 itself. The first portion 152-1 may only be a few bits or bytes in length, as the configuration information 168 is typically small in size. The remaining bits or bytes may define a second portion 152-2 and may be divided into a number of regions 150. In some embodiments, the configuration information may not be stored in a first portion 152-1 to configure the non-volatile memory 110, but may be stored in volatile memory 108 and executed by the processing unit 102. In these embodiments, the entire non-volatile memory 110 may be used for and divided into regions 150. Embodiments are not limited in this manner.

In either case, the configuration information 168 may be executed and processed by the processing unit 102, for example, to configure the non-volatile memory 110. For example, the non-volatile memory 110 may be configured into one or more regions 150 based on the configuration information 168 to store an operating system and workload containers, as previously discussed. In the illustrated example embodiment, a first region 150-1 may be generated and configured to store an operating system 164. In this example, the region 150-1 may be configured as a block device and as persistent storage that is capable of storing information when no power is present. In a similar manner, a another region 150-2 may be generated and configured to store a boot loader 166 to be executed during start-up to load the operating system 164. This region 150-2 may also be configured as a block device and as persistent memory.

Additional regions 150 may be generated to store workload containers to provide an environment to execute one or more applications and their support files in accordance with the configuration information 168. For example, in a container type environment, the processing server 105 may receive a number of containers that operating independently of each other, but share a common operating system. For example, one container may include an application and dependencies to process statistical computations and another container may include an application and dependencies to process health related information. Each of these containers may operate independently of each other, without each other's knowledge of the other container in separate regions 150, but share the same operating system.

Further, these containers and the operating system 164 may share other hardware elements including the processing unit 102, the interfaces 104, the transceiver 106, and the volatile memory 108, and so forth. For example, FIG. 1C illustrates the volatile memory 108 having run-time instructions 162 that may be for the operating system 164 and any applications running in any regions 150. These run-time instructions 162 may be processed by the processing unit 102, for example, and supplied back to their originate applications or operating system.

Figure 1D:
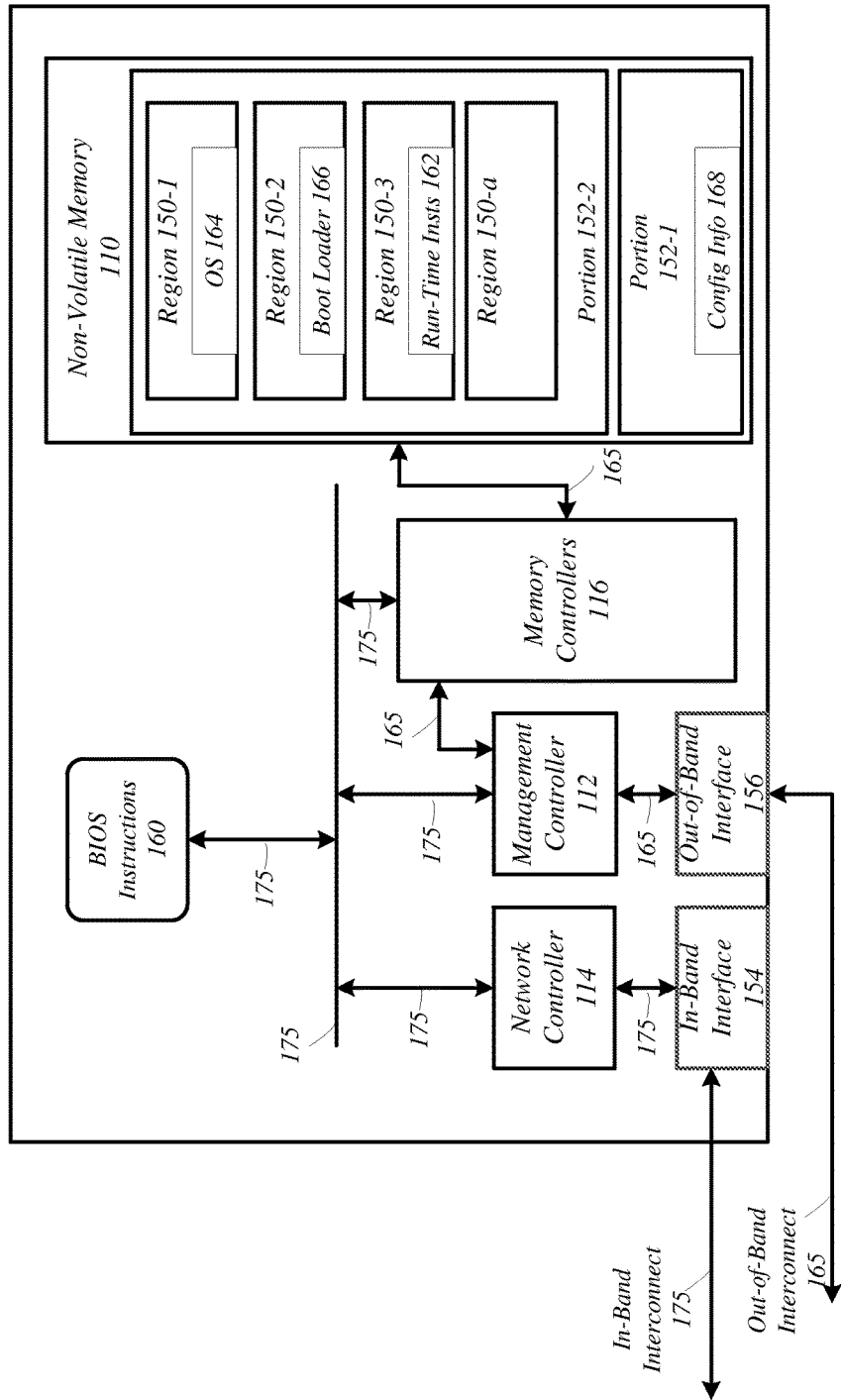
FIG. 1D illustrates a second block diagram of a device.

In some embodiments, the configuration information 168 may configure the non-volatile memory 110 to provide one or more of non-persistent primary level RAM, secondary level RAM, and persistent RAM. For example, FIG. 1D illustrates an example embodiment of a processing server 105 without volatile memory 108. Thus, a region 150-3 may be configured as non-persistent primary level RAM, for example, to store run-time instructions 162 for the operating system and applications. In some embodiments, a region configured as non-persistent or volatile may actually be persistent, but emulated to an operating system to function in a non-persistent manner. For example, the contents, such as data and information, in a region configured as non-persistent may be 'erased' or not retained through the types of state changes that conventional, non-persistent, RAM would lose its contents, such as a system reset, system restart, changes in power states, a power reset, a power loss, a power cycle, and so forth. In one example, random values or '0' may be written to a region configured as non-persistent or volatile during a state change. In another example, data may be encrypted with a key. The key may be discarded when a state change occurs and a new key may be generated during power-up. Thus, the data previously stored in the region will not be readable because the new key will not properly decrypt the data or information. Embodiments are not limited in this manner.

Figure 2A:
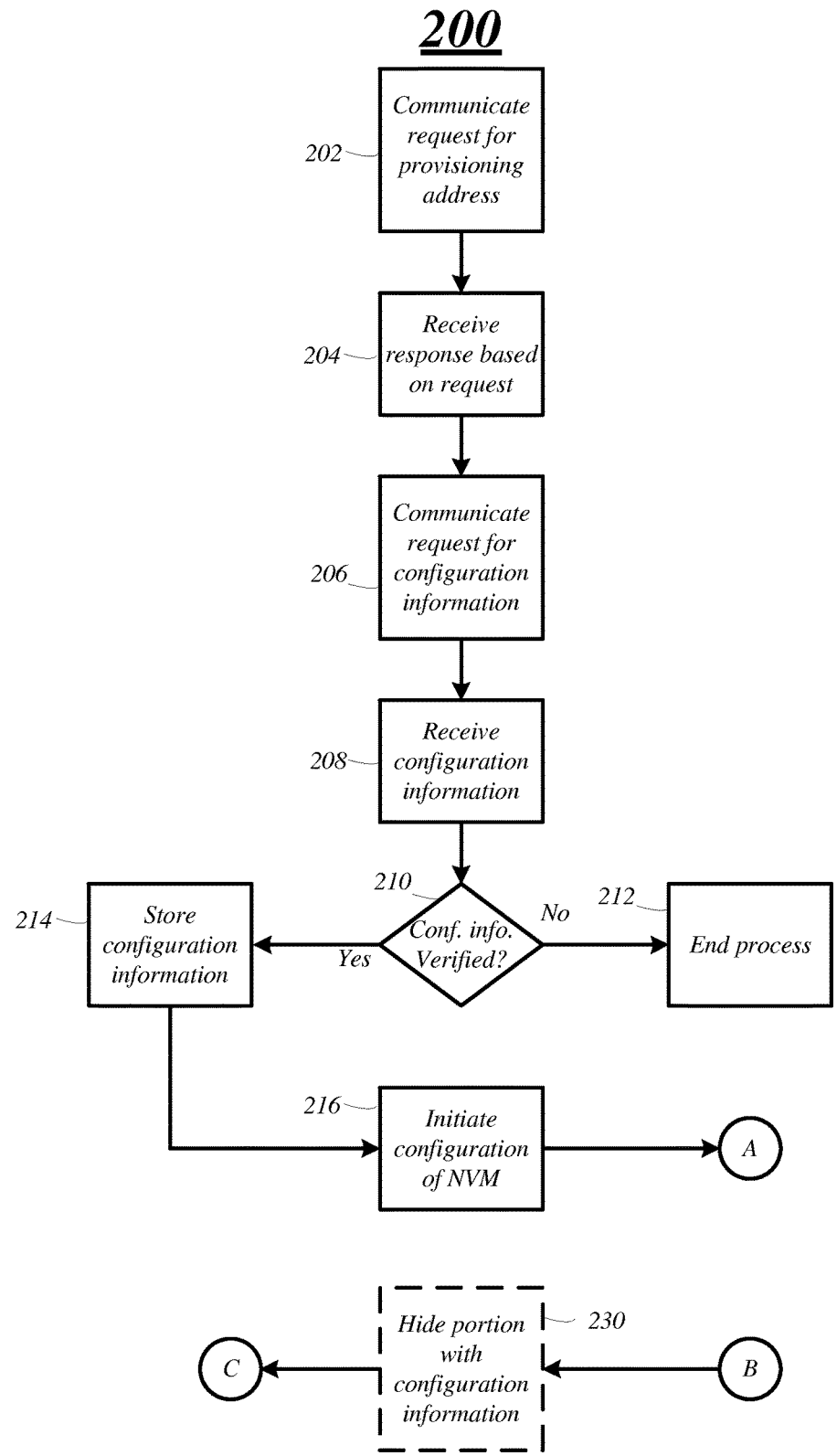
FIG. 2A illustrates an example of a first logic flow diagram.

FIGS. 2A/2B illustrates one possible example of a first logic flow 200 to process configuration information in a network boot environment. One or more operations discussed with respect to logic flow 200 may be performed by one or more components of processing server 105. Thus, various reference may be made to FIGS. 1A-1D during the discussion of logic 200. However, embodiments are not limited in this manner and operations discussed with respect to logic flow 200 may be performed by other elements or components.

At block 202, a request for an IP address and a provisioning address may be communicated in a broadcast message from processing server 105, for example. In embodiments, the request may be received by a number of other servers include a DHCP server 103. The DHCP server 103 may communicate a response and assign an IP address to the requesting server. At block 204, the response including the IP address assignment and the provisioning address may be received by the processing server 105, for example. At block 206, a request for configuration information and/or an operating system may be communicated by the processing server 105. The request may be sent to another server, such as a boot server 107, based on the provisioning address. In embodiments, the request may include additional information including an identification of the configuration information and the operating system. Embodiments are not limited in this manner.

In embodiments, a provisioning operating system may be pre-installed in secure memory or storage at the time of manufacture by an OEM to communicate the request for the provisioning address, process the response, and communicate the request for the configuration information and/or operating system. The provisioning operating system may retrieve configuration information that is unique and specific for a processing server 105. The provisioning operating system may use provisioning keys associated with the non-volatile memory 110 to request the unique configuration information for the non-volatile memory 110.

At block 208, the processing server 105 may receive information including the configuration information having an instruction set. In embodiments, this information may be received in a number of packets and in a number of exchanges between the processing server 105 and the boot server 107. Further, the information may be received as one or more files and are executable instructions that can be processed by a processing unit 102. In some embodiments, the processing server 105 may receive the configuration information over an out-of-band connection, such as out-of-band interface 156, via a dedicated channel to ensure security.

Note that in some embodiments, the configuration information may be provisioned and pre-installed in secure memory or storage at the time of manufacture by an OEM, as previously discussed. For example, the configuration information may be preloaded configuration information stored in the non-volatile memory 110 at the time of manufacture. Thus, in these embodiments, the processing server 105 may not need to retrieve configuration information from a remote device, but may retrieve it from the secure storage at block 208.

At block 210, the configuration information may be verified by the management controller 112 (or the memory controllers 116). Verification may be conducted by using one or more keys verifying a signature associated with the configuration information. In embodiments, the one or more keys may be stored in a TPM 118, as previously discussed. In some embodiments, the one or more keys associated with the configuration information may ensure that the configuration information can only configure specified regions and address ranges of the non-volatile memory 110. If the configuration information is not verified at decision block 210, the configuration process may end at block 212 including processing of logic flow 200.

Figure 2B:
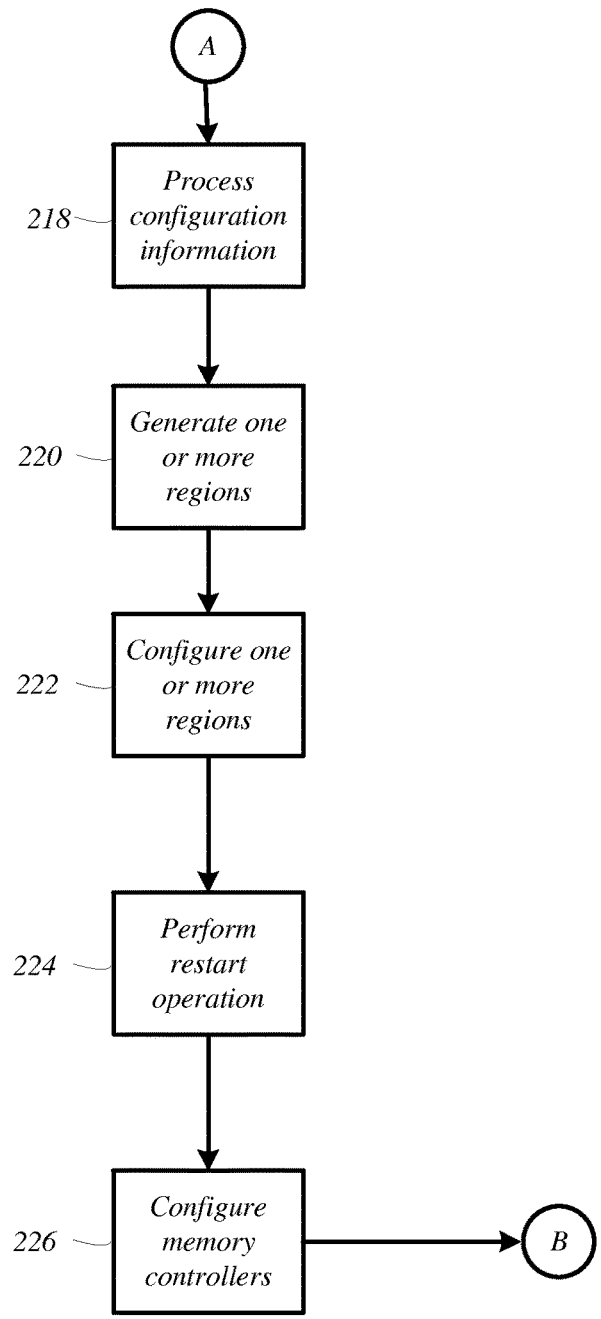
FIG. 2B illustrates a continuation of the first logic flow diagram.

If the configuration information is verified at block 210, the configuration information may be stored in volatile memory 108 or a portion of non-volatile memory 110, at block 214. Further and at block 216, configuration of the non-volatile memory 110 may be initiated. For example, a management controller 112 may instruct a processing unit 102 to execute the configuration information to configure the non-volatile memory 110. The configuration includes a number of operations and is illustrated in FIG. 2B as indicated by reference indicator A. Thus, reference is now made to FIG. 2B.

At block 218, the processing unit 102 may execute the configuration information as one or more instructions. In one example, the configuration information may be stored directly in a portion of the non-volatile memory 110 which may be read by the memory controllers 116 to configure them. In another example, the configuration information may be stored in a different memory, such as volatile memory 108 or a different non-volatile memory, and read by the processing unit 102 to configure the non-volatile memory 110. Embodiments are not limited in this manner.

Further and at block 220, one or more regions may be generated based on the configuration information. Each region may have a specified size and an address range including a start address and an end address. Each may have a particular size and address range based on the needs of an operating system or application for use in the region.

At block 222, the one or more regions may be configured. Each of the regions may be defined as persistent or non-persistent, such as a non-persistent primary level RAM, a secondary level RAM, a non-volatile block storage, a persistent RAM, and so forth. For example, one region may be defined as a persistent block storage device and is capable of storing an operating system. A different region may be configured in a similar manner and is capable of storing a workload container. A third region may be configured as non-persistent primary level RAM and store run-time instructions. Embodiments are not limited in this manner.

At block 224, a restart operation may be performed on the processing server 105. The restart operation may include starting or restarting the processing server 105 in an initial state. The initial state may include applying power to one or more controllers and invoking BIOS instructions. The BIOS instructions may execute via the processing unit 102 to configure hardware components of the processing server 105. At block 226, one or more memory controllers 116 may be configured or reconfigured based on the configuration of the non-volatile memory 110 as part of the execution of the BIOS instructions. The reconfiguration of the memory controllers 116 includes reading information stored in one or more registers of the non-volatile memory 110 and configuring the memory controllers 116 based on the information. In other instances, the information to configure the memory controllers 116 may be stored in a different non-volatile memory, such as BIOS Flash, and used to perform the reconfiguration. Other hardware such as, I/O ports, interfaces, transceivers, graphical display processors, and so forth may also be configured in accordance with the configuration information.

The logic flow 200 may continue on FIG. 2A and block 230 as indicated by indictor B. At block 230, the configuration information may be hidden from use by elements of the processing server 105. For example, a first portion of the non-volatile memory 110 originally used to store the configuration information prior to configuration may be hidden from the processing unit 102 and management controller 112 once the configuration information is used. If needed, the configuration information may be accessed again during a startup cycle by the processing unit 102 and the management controller 112.

Once the processing unit 102 has completed the configuration of the hardware devices of the processing server 105, a boot loader may be executed to boot the server into an operating system. However, if an operating system does not exist in the non-volatile memory, control can be handed back to the management controller 112 to retrieve an operating system and boot loader. Indicator C references logic flow 300 to retrieve, install, and load an operating system. Thus, reference is now made to FIG. 3.

Figure 3:
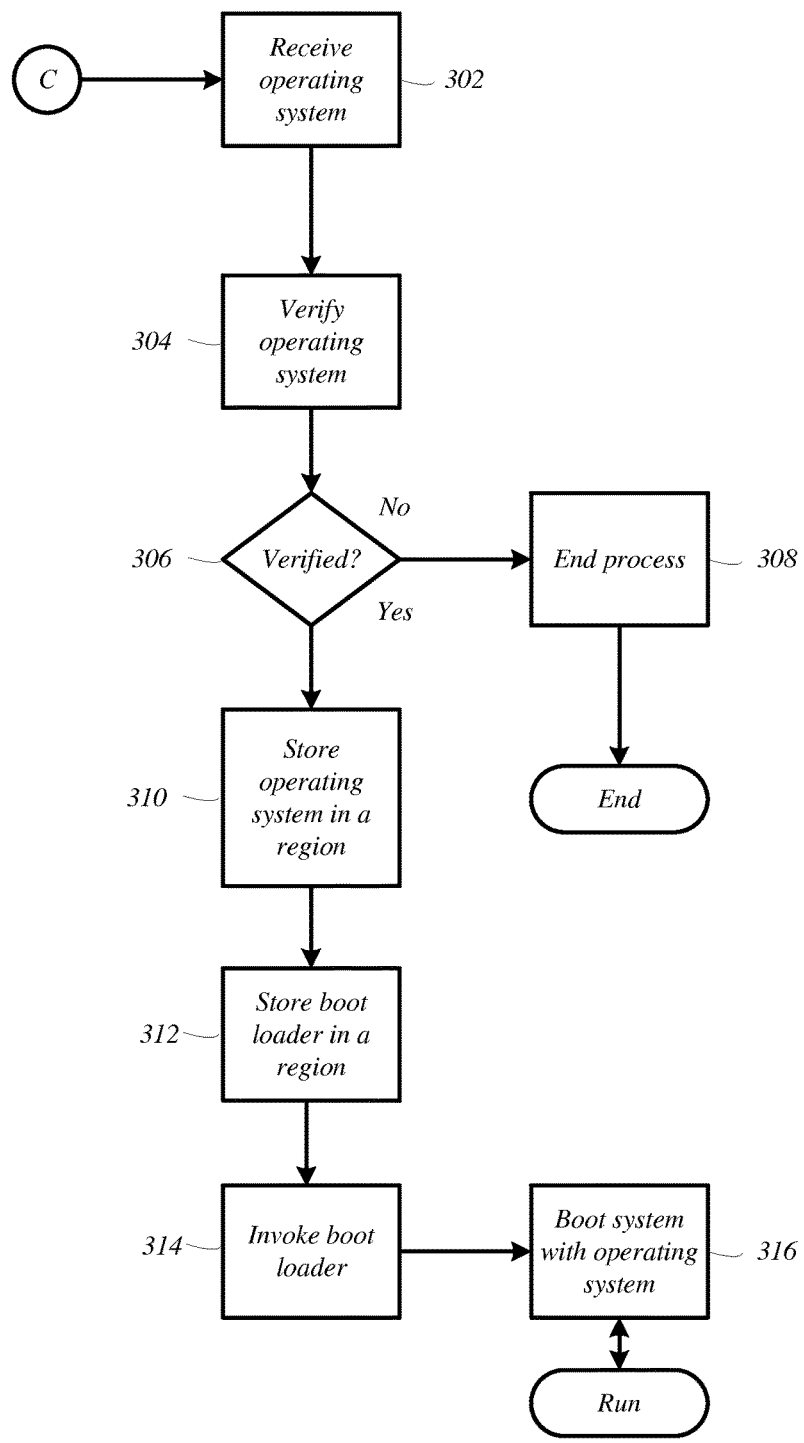
FIG. 3 illustrates an example of a second logic flow diagram.

FIG. 3 illustrates one example logic flow 300 to process information to configure an operating system in a remote boot environment. In embodiments, an operating system may be received at block 302. In some instances, the management controller 112 may request a remote device to send an operating system. The remote device may be the same or a different remote device than that which communicated the configuration information. In some embodiments, the operating system may be received in a container which includes a payload having operating system files and support files.

The logic flow 300 can also include verifying the operating system at block 304. In one example, the management controller 112 verifies a signature associated with the operating system using an encryption key. In some instances, the operating system may be temporarily stored in volatile memory or non-volatile memory during the configuration. In other instances, a key associated with the operating system may first be received and verified prior to actually receiving the operating system at block 302. Other techniques may be used to verify the operating system. Embodiments are not limited in this manner.

If the operating system is not verified at decision block 306, the installation process may be stopped at block 308. However, if the operating system is verified, the logic flow 300 may continue and the operating system may be communicated to a region of the non-volatile memory 110 for storage at block 310. As previously mentioned, a region in a portion of the non-volatile memory can be generated in the non-volatile memory configured as a block device to install the operating system in accordance with the previously executed configuration information, for example. The region is a size based on the configuration information and may have specified memory addresses or memory ranges. Embodiments are not limited in this manner.

At block 312, a boot loader for the operating system may be stored in a same or different region in non-volatile memory 110. For example, the boot loader may be stored in a dedicated region previously configured with the configuration information. However, in other instances, the boot loader may be stored in the same region as the operating system.

At block 314, the boot loader may be invoked to boot the operating system into an operational state. More specifically, the management controller 112 may instruct the processing unit 102 to invoke the boot loader stored in the non-volatile memory 110 which will cause a normal boot process for the operating system at block 316. In some embodiments, the boot loader may be used to configure the memory controllers 116. For example, the boot loader may use the configuration information and apply it to the memory controllers 116, or cause the processing unit 102 processing the BIOS instructions to apply the configuration information to the memory controllers 116. Embodiments are not limited in this manner.

The operating system may boot and the processing server 105 may then run in an operational state until a stop command is received. In some instances, one or more workload containers may be received prior to entering into an operational state for verification and storage in a region of the non-volatile memory. For example, a workload container include a payload of one or more applications and support files may be received, verified key, and if verified, store in a region previously configured from the workload container, as similarly manner as discussed above with respect to operating system. In this example, once all to workload containers are stored in regions, the operating system may be booted into. However, embodiments are not limited in this manner and the operating system may first be booted prior to storing the workload containers in the regions.

Further, logics flows 200 and 300 can be repeated any number of times, each time creating an environment to process information in accordance with a desired configuration that may have generated on an administrative server 109, for example. For example, the processing server 105 can be configured in one manner to support processing large data sets and then be reconfigure to process other information by basically going through a rebooting process or merely replacing containers. Thus, a single server may support and is capable of being reconfigured in any manner to support the needs of a customer.

FIG. 4 an embodiment of a logic flow diagram 400. The logic flow 400 may be representative of some or all of the operations executed by one or more embodiments described herein. For example, the logic flow 400 may illustrate operations performed by one or more systems, devices, and controllers in FIGS. 1-3. Various embodiments are not limited in this manner.

In various embodiments, the logic flow 400 may include storing a first set of instructions in a first portion of the non-volatile memory, the first set of instructions to configure a second portion of the non-volatile memory at block 405. The first set of instructions may be configuration information to configure the non-volatile memory and may be stored in the first few bytes of the non-volatile memory itself. The second portion may include the remaining bytes of non-volatile memory not used by the first set of instructions for storage. The first set of instructions may be received from a remote device via an out-of-band interconnect and processed by a management controller for storage in the non-volatile memory. In some instances, the first set of instructions may have been provisioned in a non-volatile memory or storage at the time of manufacture by an OEM, the non-volatile memory may be the same or a different memory device than the non-volatile memory being configured.

At block 410, the logic flow 400 may include causing the processing unit to process the first set of instructions to configure the second portion with one or more regions. For example, a management controller may communicate a signal or information instructing the processing unit to process the first set of instructions in the non-volatile memory. The signal may have been generated during a power-on initiation sequence. The first set of instructions may execute and one or more regions may be generated in the non-volatile memory. The regions may each have a specified size and address range. Further, each region may be configured as a persistent memory or non-persistent memory, as previously discussed. In some instances, one or more regions may be configured as block devices and store information in a block format. Embodiments are not limited in this manner.

In embodiments, the logic flow 400 may also include causing a configuration of the memory controller based on the first set of instructions at block 415. For example, the management controller may cause the system to perform a restart operation. The restart operation may start the system in an initial state causing one or more BIOS instructions to be executed by a processing unit. The BIOS instructions, executed by the processing unit, may configure hardware devices of the system including configuration of the memory controllers based on information stored in the non-volatile memory. Embodiments are not limited in this manner.

Figure 5:
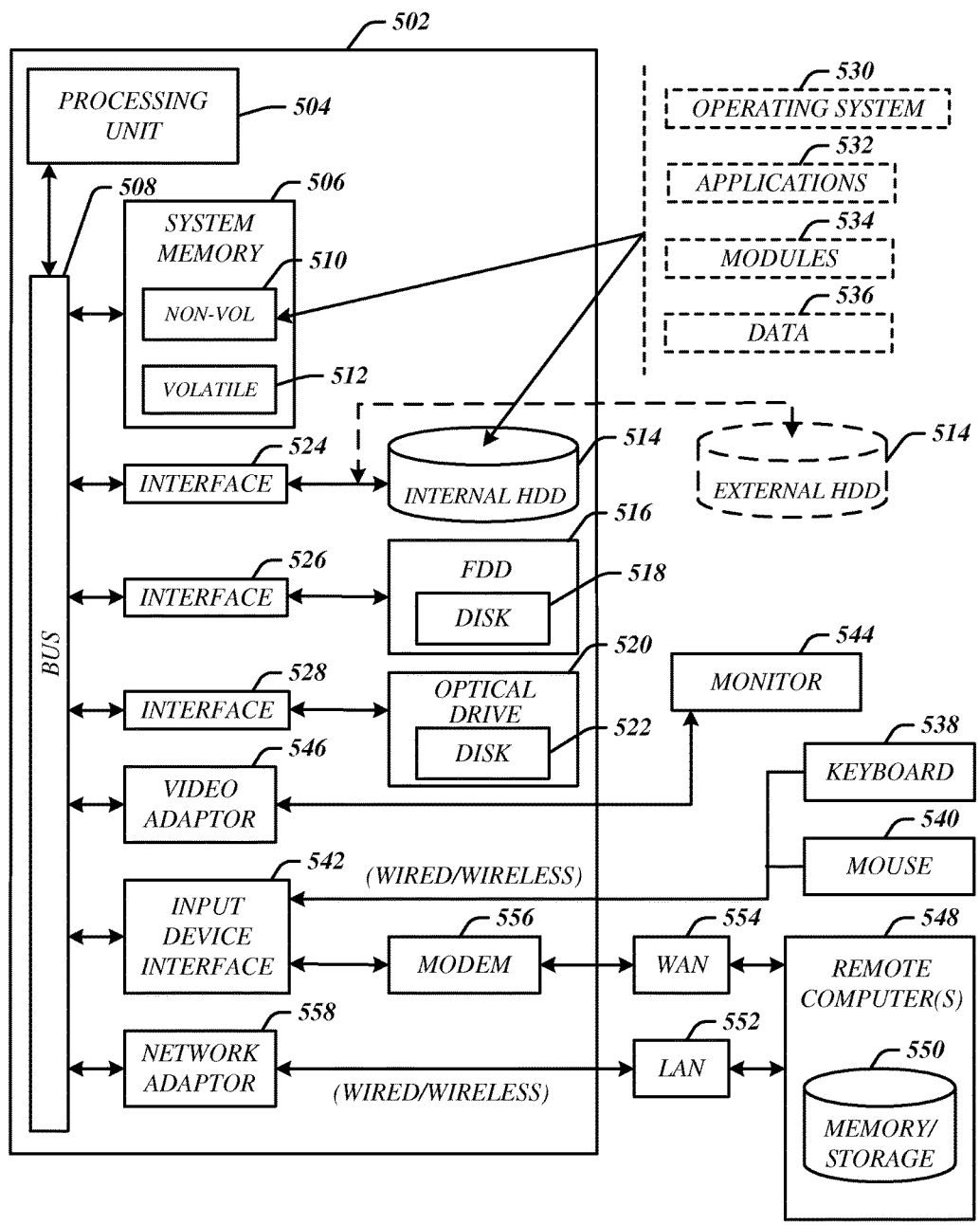
FIG. 5 illustrates an example of a computing architecture.

FIG. 5 illustrates an embodiment of an exemplary computing architecture 500 suitable for implementing various embodiments and as previously described. In one embodiment, the computing architecture 500 may include elements, features, components at least partially implemented as part of system 100.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 100.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 502 family of standards, such as wireless devices operatively disposed in wireless communication (e.g., IEEE 502.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 502.11x (a, b, g, n, etc.) to provide secure, reliable, fast wireless connectivity. A Wi-Fi network can be used to connect computers to each other, to the Internet, and to wire networks (which use IEEE 502.3-related media and functions).

The various elements of the systems 100 and biometric module 150 as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, a device, and/or an apparatus may include a controller coupled with a processing unit, a memory controller, and non-volatile memory. The controller to store a first set of instructions in a first portion of the non-volatile memory, the first set of instructions to configure a second portion of the non-volatile memory, cause the processing unit to process the first set of instructions to configure the second portion with one or more regions, and cause a configuration of the memory controller based on the first set of instructions.

In a second example and in furtherance of the first example, a system, device, apparatus may include the controller coupled with an out-of-band interface capable of receiving the first set of instructions, a second set of instruction, and an operating system, and the controller to direct the operating system to a first region for storage and the second set of instructions to a second region for storage, the first and second regions in the second portion.

In a third example and in furtherance of any previous example, a system, device, apparatus may include the second set of instructions comprising a boot loader to execute a boot operation to load the operating system.

In a fourth example and in furtherance of any previous example, a system, device, apparatus may include the controller to validate at least one of the operating system, the first set of instructions, and the second set of instructions using a trusted platform module having one or more keys.

In a fifth example and in furtherance of any previous example, a system, device, apparatus may include the first set of instructions to define a size and an address range for each of the one or more regions.

In a sixth example and in furtherance of any previous example, a system, device, apparatus may include the first set of instructions to define each of the one or more regions as one of a non-persistent primary level random-access memory (RAM), a non-persistent secondary level RAM, a non-volatile block storage, and a persistent RAM.

In a seventh example and in furtherance of any previous example, a system, device, apparatus may include the controller to initiate a restart operation and, via a set of basic input/output system (BIOS) instructions, cause the configuration of the memory controller based on the first set of instructions.

In an eighth example and in furtherance of any previous example, a system, device, apparatus may include the controller to block access to the first portion of the non-volatile memory from at least one of the processing unit, a management controller, and memory controllers, subsequent configuration of the second portion.

In a ninth example and in furtherance of any previous example, a system, device, apparatus may include the controller communicate a request for an internet protocol assignment and a provisioning address, receive a response including at least the provisioning address associated with a remote device, communicate a second request for an operating system to the remote device based on the provisioning address, receive, via an out-of-band interface, the operating system in response to the second request, and store the operating system in a first region.

In a tenth example and in furtherance of any previous example, a method may include storing a first set of instructions in a first portion of a non-volatile memory, the first set of instructions to configure a second portion of the non-volatile memory, causing a processing unit to process the first set of instructions to configure the second portion with one or more regions, and causing a configuration of a memory controller based on the first set of instructions.

In an eleventh example and in furtherance of any previous example, a method may include storing an operating system in a first region and a second set of instructions in a second region in the second portion of the non-volatile memory, the operating system and the second set of instructions received via an out-of-band interface.

In a twelfth example and in furtherance of any previous example, a method may include the second set of instructions comprising a boot loader to execute a boot operation to load the operating system.

In a thirteenth example and in furtherance of any previous example, a method may include validating at least one of first set of instructions, the operating system, and the second set of instructions using a trusted platform module having one or more keys.

In a fourteenth example and in furtherance of any previous example, a method may include the first set of instructions to define the one or more regions as at least one of a non-persistent primary level random-access memory (RAM), a non-persistent secondary level RAM, a non-volatile block storage, and a persistent RAM, and each of the one or more regions having a size within an address range.

In a fifteenth example and in furtherance of any previous example, a method may include initiating a restart operation, via a set of basic input/output system (BIOS) instructions, to cause the configuration of the memory controller based on the first set of instructions.

In a sixteenth example and in furtherance of any previous example, a method may include blocking access to the first portion of the non-volatile memory from at least one of the processing unit, a management controller, and the memory controller, subsequent configuration of the second portion.

In a seventeenth example and in furtherance of any previous example, a method may include communicating a request for an internet protocol assignment and a provisioning address, receiving a response including at least the provisioning address associated with a remote device, communicating a second request for an operating system to the remote device based on the provisioning address, receiving, via an out-of-band interface, the operating system in response to the second request, and storing the operating system in a first region.

In an eighteenth example and in furtherance of any previous example, a non-transitory computer-readable storage medium comprising a plurality of instructions that when executed enable processing circuitry to store a first set of instructions in a first portion of a non-volatile memory, the first set of instructions to configure a second portion of the non-volatile memory, cause a processing unit to process the first set of instructions to configure the second portion with one or more regions, and cause a configuration of a memory controller based on the first set of instructions.

In a nineteenth example and in furtherance of any previous example, a non-transitory computer-readable storage medium comprising a plurality of instructions that when executed enable processing circuitry to store an operating system in a first region and a second set of instructions in a second region in the second portion of the non-volatile memory, the operating system and the second set of instructions received via an out-of-band interface.

In a twentieth example and in furtherance of any previous example, a non-transitory computer-readable storage medium comprising a plurality of instructions that when executed enable processing circuitry to include the second set of instructions comprising a boot loader to execute a boot operation to load the operating system.

In a twenty-first example and in furtherance of any previous example, a non-transitory computer-readable storage medium comprising a plurality of instructions that when executed enable processing circuitry to validate at least one of first set of instructions, the operating system, and the second set of instructions using a trusted platform module having one or more keys.

In a twenty-second example and in furtherance of any previous example, a non-transitory computer-readable storage medium comprising a plurality of instructions that when executed enable processing circuitry to include the first set of instructions to define the one or more regions as at least one of a non-persistent primary level random-access memory (RAM), a non-persistent secondary level RAM, a non-volatile block storage, and a persistent RAM, and each of the one or more regions having a size within an address range.

In a twenty-third example and in furtherance of any previous example, a non-transitory computer-readable storage medium comprising a plurality of instructions that when executed enable processing circuitry to initiate a restart operation and cause, via a set of basic input/output system (BIOS) instructions, the configuration of the memory controller based on the first set of instructions.

In a twenty-fourth example and in furtherance of any previous example, a non-transitory computer-readable storage medium comprising a plurality of instructions that when executed enable processing circuitry to block access to the first portion of the non-volatile memory from at least one of the processing unit, a management controller, and the memory controller, subsequent configuration of the second portion.

In a twenty-fifth example and in furtherance of any previous example, a non-transitory computer-readable storage medium comprising a plurality of instructions that when executed enable processing circuitry to communicate a request for an internet protocol assignment and a provisioning address, receive a response including at least the provisioning address associated with a remote device, communicate a second request for an operating system to the remote device based on the provisioning address, receive, via an out-of-band interface, the operating system in response to the second request, and store the operating system in a first region.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a non-volatile memory;
a memory controller coupled to the non-volatile memory;
a processing unit coupled to the non-volatile memory; and
a controller coupled with the processing unit, the memory controller, and the non-volatile memory, the controller to:
store a first set of instructions in a first portion of the non-volatile memory, the first set of instructions to configure a second portion of the non-volatile memory;
cause the processing unit to process the first set of instructions to configure the second portion of the non-volatile memory with one or more regions and to define at least one of the one or more regions as non-persistent memory;
cause a configuration of the memory controller based on the first set of instructions;
receive, via an out-of-band interface, an operating system in response to communication of a request; and
store the operating system in a first region of the second portion of the non-volatile memory.

2. The apparatus of claim 1, the controller coupled with an out-of-band interface capable of receiving the first set of instructions, a second set of instruction, and an operating system, and the controller to direct the operating system to a first region for storage and the second set of instructions to a second region for storage, the first and second regions in the second portion.

3. The apparatus of claim 2, the second set of instructions comprising a boot loader to execute a boot operation to load the operating system.

4. The apparatus of claim 2, the controller to validate at least one of the operating system, the first set of instructions, and the second set of instructions using a trusted platform module having one or more keys.

5. The apparatus of claim 1, the first set of instructions to define a size and an address range for each of the one or more regions.

6. The apparatus of claim 1, the processing unit to process the first set of instructions to configure the second portion of the non-volatile memory with a plurality of regions and to define each of the one or more regions as one of a non-persistent primary level random-access memory (RAM), a non-persistent secondary level RAM, a non-volatile block storage, or a persistent RAM.

7. The apparatus of claim 1, the controller to initiate a restart operation and, via a set of basic input/output system (BIOS) instructions, cause the configuration of the memory controller based on the first set of instructions.

8. The apparatus of claim 1, the controller to block access to the first portion of the non-volatile memory from at least one of the processing unit, a management controller, and memory controllers, subsequent configuration of the second portion.

9. The apparatus of claim 1, the controller to:
communicate a first request for an internet protocol assignment and a provisioning address;
receive a response including at least the provisioning address associated with a remote device; and
communicate the request for the operating system to the remote device based on the provisioning address.

10. A computer-implemented method, comprising:
storing a first set of instructions in a first portion of a non-volatile memory, the first set of instructions to configure a second portion of the non-volatile memory;
causing a processing unit to process the first set of instructions to configure the second portion of the non-volatile memory with one or more regions and to define at least one of the one or more regions as non-persistent memory;
causing a configuration of a memory controller based on the first set of instructions;
receiving, via an out-of-band interface, an operating system in response to communication of a request; and
storing the operating system in a first region of the second portion of the non-volatile memory.

11. The computer-implemented method of claim 10, comprising:
storing an operating system in a first region and a second set of instructions in a second region in the second portion of the non-volatile memory, the operating system and the second set of instructions received via an out-of-band interface.

12. The computer-implemented method of claim 11, the second set of instructions comprising a boot loader to execute a boot operation to load the operating system.

13. The computer-implemented method of claim 11, comprising:

validating at least one of first set of instructions, the operating system, and the second set of instructions using a trusted platform module having one or more keys.

14. The computer-implemented method of claim 10, the first set of instructions to configure the second portion of the non-volatile memory with a plurality of regions and to define each of the plurality of regions as one of a non-persistent primary level random-access memory (RAM), a non-persistent secondary level RAM, a non-volatile block storage, or a persistent RAM, and each of the one or more regions having a size within an address range.

15. The computer-implemented method of claim 10, comprising:
initiating a restart operation; and
causing, via a set of basic input/output system (BIOS) instructions, the configuration of the memory controller based on the first set of instructions.

16. The computer-implemented method of claim 10, comprising:
blocking access to the first portion of the non-volatile memory from at least one of the processing unit, a management controller, and the memory controller, subsequent configuration of the second portion.

17. The computer-implemented method of claim 10, comprising:
communicating a first request for an internet protocol assignment and a provisioning address;
receiving a response including at least the provisioning address associated with a remote device; and
communicating the request for the operating system to the remote device based on the provisioning address.

18. A system comprising:
a processing unit;
a non-volatile memory coupled with a memory controller and the processing unit;
a controller coupled with the processing unit, the non-volatile memory and the memory controller, the controller to:
store a first set of instructions in a first portion of the non-volatile memory, the first set of instructions to configure a second portion of the non-volatile memory;
cause the processing unit to process the first set of instructions to configure the second portion of the non-volatile memory with one or more regions and to define at least one of the one or more regions as non-persistent memory;
cause a configuration of the memory controller based on the first set of instructions;

receive, via an out-of-band interface, an operating system in response to communication of a request; and
store the operating system in a first region of the second portion of the non-volatile memory.

19. The system of claim 18, the controller to store an operating system in a first region and a second set of instructions in a second region in the second portion of the non-volatile memory, the operating system and the second set of instructions received via an out-of-band interface.

20. The system of claim 19, the second set of instructions comprising a boot loader to execute a boot operation to load the operating system.

21. The system of claim 19, the controller to validate at least one of first set of instructions, the operating system, and the second set of instructions using a trusted platform module having one or more keys.

22. The system of claim 18, the first set of instructions to configure the second portion of the non-volatile memory with a plurality of regions and to define each of the plurality of regions as one of a non-persistent primary level random-access memory (RAM), a non-persistent secondary level RAM, a non-volatile block storage, or a persistent RAM, and each of the one or more regions having a size within an address range.

23. The system of claim 18, the controller to initiate a restart operation and, via a set of basic input/output system (BIOS) instructions, cause the configuration of the memory controller based on the first set of instructions.

24. The system of claim 18, the controller to block access to the first portion of the non-volatile memory from at least one of the processing unit, a management controller, and memory controllers, subsequent configuration of the second portion.

25. The system of claim 18, the controller to:
communicate a first request for an internet protocol assignment and a provisioning address;
receive a response including at least the provisioning address associated with a remote device; and
communicate the request for the operating system to the remote device based on the provisioning address.

26. The system of claim 18, further comprising at least one of:
a display communicatively coupled to the processing unit;
a battery coupled to the processing unit; or
at least one network interface communicatively coupled to the processing unit.

* * * * *